United States Patent
Boyd et al.

(10) Patent No.: US 9,690,503 B2
(45) Date of Patent: Jun. 27, 2017

(54) RETURNING COHERENT DATA IN RESPONSE TO A FAILURE OF A STORAGE DEVICE WHEN A SINGLE INPUT/OUTPUT REQUEST SPANS TWO STORAGE DEVICES

(71) Applicant: INTEL CORPORATION, Santa Clara, CA (US)

(72) Inventors: James A. Boyd, Hillsboro, OR (US); Scott E. Burridge, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 2 days.

(21) Appl. No.: 14/751,737

(22) Filed: Jun. 26, 2015

(65) Prior Publication Data

US 2016/0378370 A1    Dec. 29, 2016

(51) Int. Cl.
*G06F 3/06* (2006.01)

(52) U.S. Cl.
CPC ........... *G06F 3/0619* (2013.01); *G06F 3/064* (2013.01); *G06F 3/0659* (2013.01); *G06F 3/0683* (2013.01)

(58) Field of Classification Search
CPC .... G06F 3/0619; G06F 3/0683; G06F 3/0659; G06F 3/064
See application file for complete search history.

(56) References Cited

U.S. PATENT DOCUMENTS

| 7,711,897 | B1 | 5/2010 | Chatterjee et al. |
| 8,402,209 | B1 | 3/2013 | Chatterjee et al. |
| 2012/0059978 | A1 | 3/2012 | Rosenband et al. |
| 2013/0132671 | A1* | 5/2013 | Woodhouse ........ G06F 11/1076 711/114 |
| 2014/0181474 | A1 | 6/2014 | Gewirtz et al. |

FOREIGN PATENT DOCUMENTS

WO    2015/023744    2/2015

OTHER PUBLICATIONS

NVM Express, Inc., "NVM Express", Revision 1.2, Nov. 3, 2014, 205 pp.
Serial ATA International Organization, "Serial ATA Revision 3.2", Aug. 7, 2013, 874 pp. (Submitted in two parts to comply with EFS-Web file size limits—Part A: 142 pp; Part B: 732 pp.).
International Search Report for International Application No. PCT/US2016/034475, dated Aug. 16, 2016, 11 pp. [77.319PCT (ISR & WO)].

* cited by examiner

*Primary Examiner* — Michael Alsip
(74) *Attorney, Agent, or Firm* — Konrad Raynes Davda & Victor LLP; Rabindranath Dutta

(57) ABSTRACT

A controller maintains exposed and unexposed locations of a first storage device and a second storage device. In response to receiving a request a perform a write operation to write data in locations that span the first storage device and the second storage device, the controller atomically writes an entirety of the data in the unexposed locations of the first storage device.

21 Claims, 10 Drawing Sheets

RETURNING COHERENT DATA IN RESPONSE TO A FAILURE OF A STORAGE DEVICE WHEN A SINGLE INPUT/OUTPUT REQUEST SPANS TWO STORAGE DEVICES

BACKGROUND

A controller may control access to a plurality of storage devices. In response to input/output (I/O) requests from applications that execute in one or more host computational devices that are coupled to the controller, the controller may perform corresponding I/O operations on one or more of the plurality of storage devices and return one or more responses to the one or more host computational devices. In certain situations, the I/O requests may be generated by applications that execute in the controller, and the controller may perform corresponding I/O operations on one or more of the plurality of storage devices and return one or more responses to the applications.

In certain situations, the plurality of storage devices may be hard disk drives (HDD) or solid state drives (SSD) or other types of storage devices. In certain situations, the HDDs or SSDs may be configured as a redundant array of independent disks (RAID) or in some other configuration. The controller may comprise a RAID controller, HDD controllers, SSD controllers, and other controllers that interface with the plurality of storage devices. In certain situations, the controller may be a storage controller.

Applications executing in the host computational devices or in the controller may perform I/O by addressing storage via logical addresses. The controller may map the logical addresses to physical addresses on one or more of the plurality of storage devices by using the interfaces to the storage devices. In certain situations, when a range of logical addresses corresponding to a single I/O request from an application is mapped by the controller (and/or the interfaces) to physical addresses on the storage devices, the physical addresses may span more than one storage device.

BRIEF DESCRIPTION OF THE DRAWINGS

Referring now to the drawings in which like reference numbers represent corresponding parts throughout.

DETAILED DESCRIPTION

In certain storage device configurations, I/O operations may need to be issued to several storage devices at a time. For example, a single I/O request from a host may be split up into two or more I/O operations to allow the I/O request to be satisfied by the underlying storage devices. In situations where the single I/O request is split, one part of the data may be written to one storage device and another part of the data may be written to another storage device. If there is loss of power during such a process, it is possible that the data may only be written to one storage device or the other. This may lead to data corruption.

Certain embodiments ensure that data corruption is avoided in the event of a power loss or in the event of some other type of failure of a storage device. The data remains as it was previously or the new data in its entirety is written. Data corruption is avoided, by preventing a situation in which the data existing in the system is partly the new data and partly the previously written data.

In the following description, reference is made to the accompanying drawings which form a part hereof and which illustrate several embodiments. It is understood that other embodiments may be utilized and structural and operational changes may be made.

Figure 1:
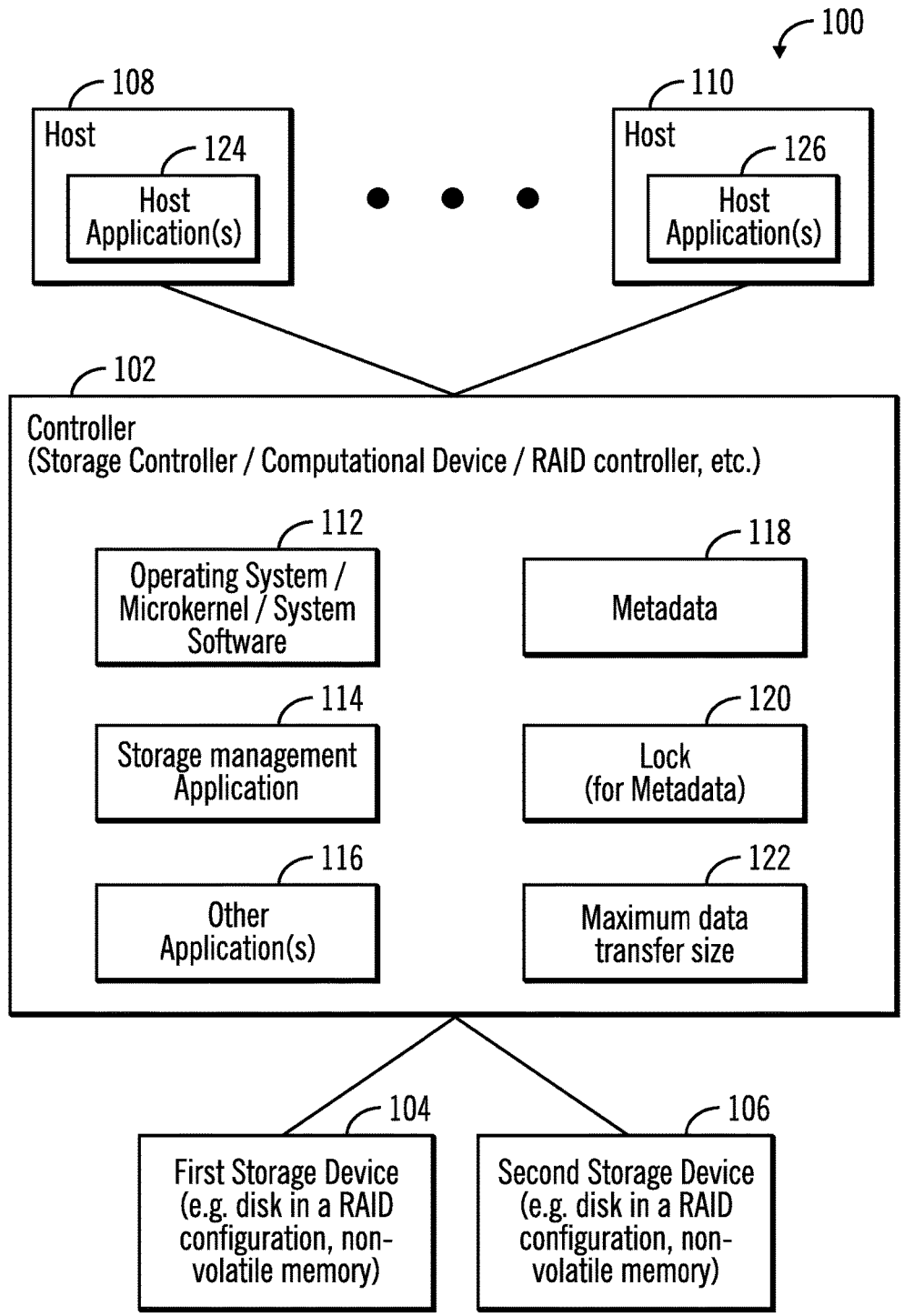
FIG. 1 illustrates a block diagram of a computing environment in which a controller that controls a plurality of storage devices is coupled to one or more hosts, in accordance with certain embodiments.

FIG. 1 illustrates a block diagram of a computing environment 100 in which a controller 102 that controls a plurality of storage devices 104, 106 is coupled to one or more hosts 108, 110, in accordance with certain embodiments.

The controller 102 and the hosts 108, 110 may be comprised of any suitable computational device, such as a personal computer, a mainframe, a telephony device, a smart phone, a storage controller, a hardware controller, a blade computer, a processor with memory, etc. The hosts 108, 110 may be referred to as a host computing system or as a computational device. While only two hosts 108, 110 are shown, there may be additional hosts in other embodiments. The controller 102 may be a RAID controller, a memory controller, a storage controller, a disk controller or any other suitable controller.

The storage devices 104, 106 may be referred to as a first storage device 104 and a second storage device 106. While only two storage devices 104, 106 are shown, in other embodiments there may be additional storage devices. The storage devices 104, 106 may be disk drives, solid state drives, non-volatile memory, or any other type of suitable storage devices. Non-volatile memory may include NAND memory included in non-volatile memory chips, NOR memory or some other suitable non-volatile memory, such as, phase change memory (PCM), a byte addressable three dimensional cross point memory, a resistive memory, nanowire memory, ferro-electric transistor random access memory (FeTRAM), magnetoresistive random access memory (MRAM) memory that incorporates memristor technology, spin transfer torque (STT)-MRAM, byte addressable random access non-volatile memory, etc. In certain embodiments, the storage devices 104, 106 may also include non-volatile dynamic random access memory (NVDRAM).

The controller 102 may communicate with the storage devices 104, 106 over a bus (such as Peripheral Component Interconnect (PCIe), Serial Advanced Technology Attachment (SATA), Serial Attached Small Computer System Interface (SAS)) or a network, such as the Internet, a storage area network (SAN), a local area network (LAN), etc. Further details of the SATA specification may be found in the publication titled "Serial ATA Specification, Revision 3.2," released August 2013, by SATA International Organization (SATA-IO), Beaverton, Oreg. In another example, the interface and/or interconnect protocol may comply and/or be compatible with an NVMe (Non-Volatile Memory Host Controller Interface Express). Further details of NVMe may be found in the publication titled "NVM Express™, Revision 1.2," released Nov. 3, 2014 by NVM Express™ Work Group, and/or earlier and/or later versions of this specification (NVM Express is a trademark of NVM Express, Inc.). In FIG. 1 the storage devices 104, 106 have been shown as being external to the controller 102. In alternative embodiments, the storage devices 104, 106 may be included within a chassis of the controller 102.

The controller 102 may include an operating system 112 or other controlling software such as a microkernel or other system software, a storage management application 114, and other applications 116. The storage management application 114 and the other applications 116 may be implemented in software, hardware, firmware or any combination thereof and may be executed under the control of the operating system 112.

The controller 102 also has provisions for controlling metadata 118, a lock 120, and an identifier 122 that indicates the maximum transfer size supported for transfer of data to or from the storage devices 104, 106. The metadata 118 may be stored in the controller or in one or more storage devices and may be implemented in certain embodiments as a data structure on which a lock may be obtained. The identifier 122 may also be referred to as a maximum data transfer size data structure 122. The metadata 118 provides a mapping of logical addresses used by host applications 124, 126 that execute in the hosts 108, 110 to physical addresses of the storage devices 104, 106. The metadata 118 also provides a mapping of logical addresses used by applications 116 that execute in the controller 102 to physical addresses of the storage devices 104, 106. The metadata 118 indicates the physical locations to which the logical addresses map into.

The storage management application 114 may acquire the lock 120 to exclusively update the metadata 118 and subsequently release the lock 120 so that the metadata may be updated or accessed once again.

The indicator 122 indicates the maximum transfer size supported for transfer of data to or from the storage devices 104, 106. For example, if the maximum transfer size is 64 kilobytes then each I/O request may request the writing or reading of no more than 64 kilobytes of data. It is of course possible for physical addresses corresponding to logical addresses of the I/O request to span a plurality of storage devices.

In certain embodiments any of the host applications 124, 126 or applications 116 may generate a write request to perform write operations on a range of logical addresses, where the physical addresses corresponding to the range of logical addresses may span both the first storage device 104 and the second storage device 106. If the write data were to be split for writing one part of the write data to the first storage device 104 and another part of the write data to the second storage device 106, then if there is a power failure or any other type of failure of the first or the second storage device, then coherent data may not reside in the storage devices 104, 106. Data is said to be coherent if the data for a single I/O that is stored in the storage devices 104, 106 is either a previously written data or a newly written data but not a mix of previously written data and newly written data.

In certain embodiments, the entirety of the write data is atomically written to an extended area of the first storage device or an extended area of the second storage device where the extended areas are not exposed to the host applications 124, 126 or the applications 116. As a result, one of the two storage devices 104, 106 always has the entirety of a previously written version of the data, and the previously written version of the data which is coherent data may be used in the event of a failure of the storage device to which new data is being written.

Figure 2:
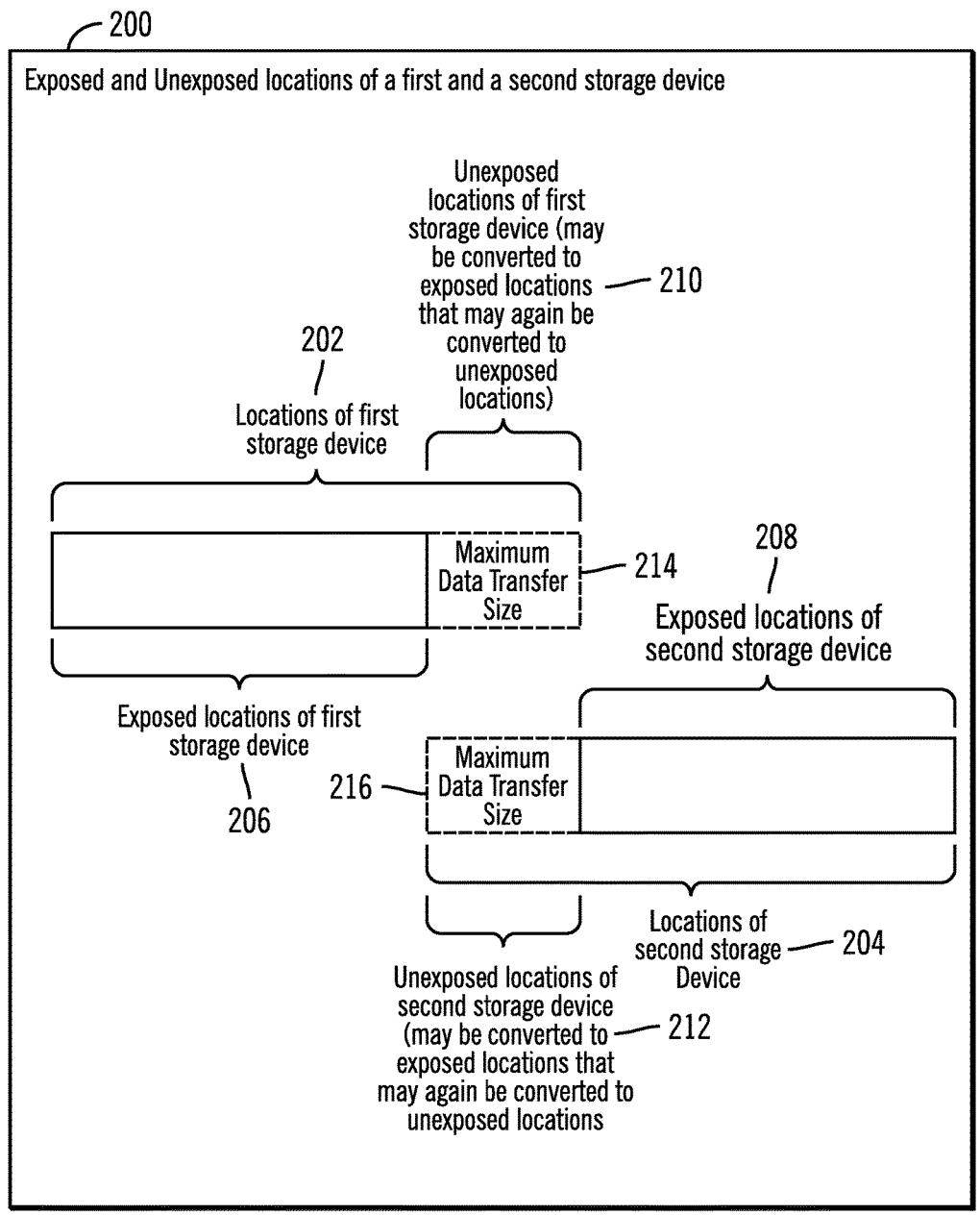
FIG. 2 illustrates a block diagram that shows exposed and unexposed locations of a first storage device and a second storage device, in accordance with certain embodiments.

FIG. 2 illustrates a block diagram 200 that shows exemplary exposed and unexposed locations of the first storage device 104 and the second storage device 106, in accordance with certain embodiments.

In certain embodiments, the storage locations of the first storage device 104 are shown via reference numeral 202 and the storage locations of the second storage device 106 are shown via reference numeral 204. The storage locations 202, 204 are physical addresses and may comprise blocks, tracks, or any other unit of storage.

In certain embodiments, the storage management application 114 ensures that locations 206 of the first storage device 104 and locations 208 of the second storage device 106 are exposed for writing or reading to applications other than the storage management application 114. The storage locations 210, 212 are each at least the size of the maximum data transfer size 214, 216 that is maintained in the maximum data transfer size data structure 122 in the controller 102.

The organization of the storage locations of the first storage device 104 and the second storage device 106 is such that the unexposed locations 210 or the unexposed locations 212 are used to store the entirety of the write data of a split write I/O whose write data would have been written partly on the first storage device 104 and partly on the second storage device 106 if the unexposed locations 210, 212 were not used for storing the entirety of the write data of a split write I/O. The unexposed locations 210 may be converted to exposed locations after new data has been written to the unexposed locations 210 and the metadata 118 has been updated. Similarly the unexposed locations 212 may be converted to exposed locations after new data has been written to the unexposed locations 212 and the metadata 118 has been updated. When locations 210 are converted to exposed locations, locations 212 are converted to unexposed locations. Similarly, when locations 212 are converted to exposed locations, locations 210 are converted to unexposed locations. Thus, reference numerals 210, 212 show locations that may be exposed or unexposed at various points in time. When locations 210 are unexposed, the locations 212 may be exposed, and vice versa.

Figure 3:
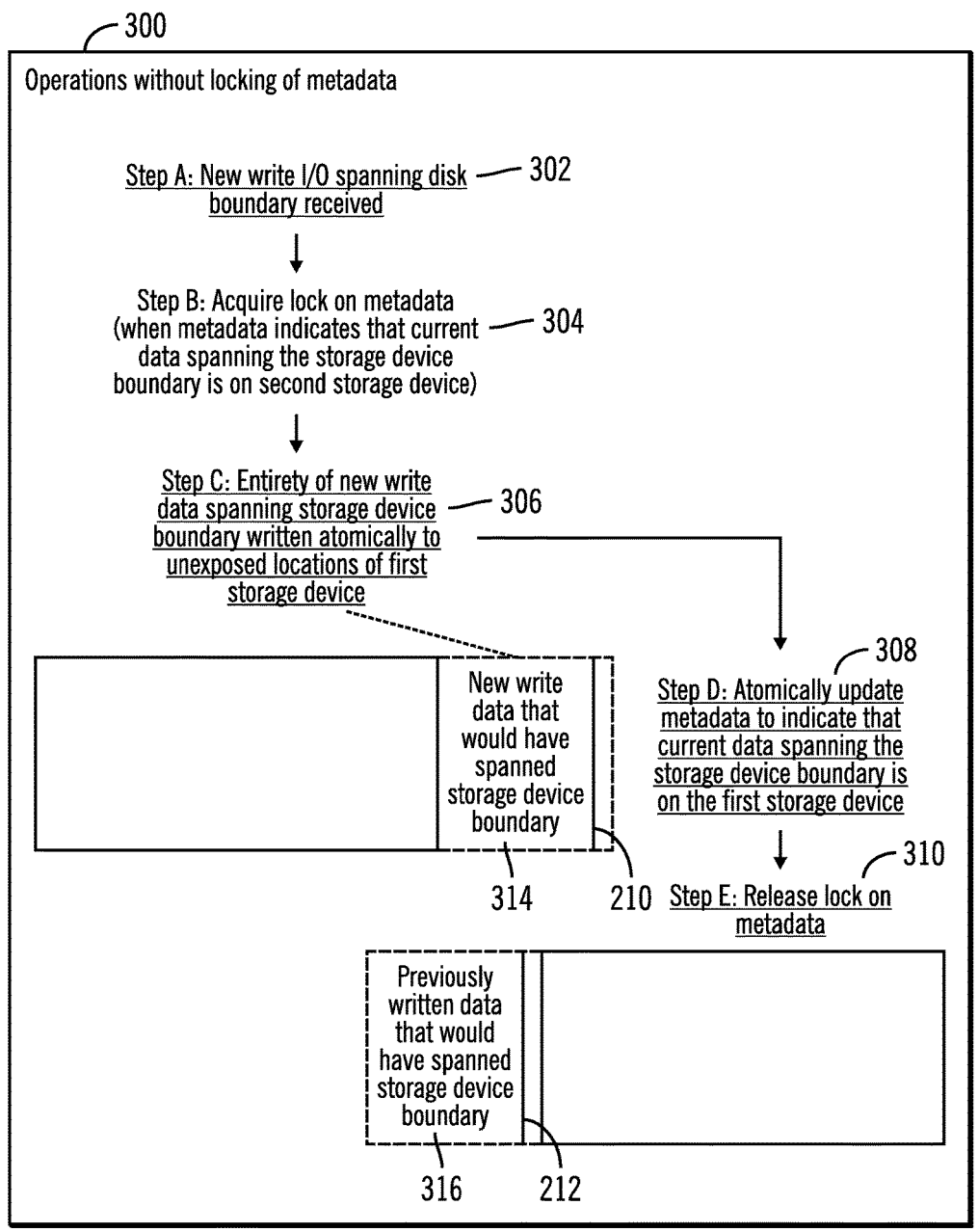
FIG. 3 illustrates a block diagram that shows operations for returning coherent data when metadata is locked, in accordance with certain embodiments.

FIG. 3 illustrates a block diagram 300 that shows operations for returning coherent data when locking of the metadata 118 is performed, in accordance with certain embodiments.

In step A 302, the storage management application 114 receives a new write I/O that spans storage device boundaries, such as HDD or SSD boundaries. Control proceeds to step B 304 in which the storage management application 114 acquires the lock 120 of the metadata 118 for exclusive access to the metadata 118. The metadata 118 may at this point indicate that the most recent version of data already written to the storage locations of the new write I/O is in the second storage device 106 in the exposed locations which were previously unexposed storage locations 212. Control proceeds to step C 306 in which the storage management application 114 atomically writes the entirety of the new write data that spans the storage device boundary to the unexposed locations 210 of the first storage device 104. Atomic writing of the entirety of the new write data means that either the entirety of the new write data is written or nothing is written.

At the conclusion of step C 306, the unexposed locations 210 have the new write data 314 whereas the locations 212 of the second storage device 106 have the previously written data 316 to the same logical storage addresses. The new write data 314 would have been partially written towards the end of the first storage device 104 and partially towards the beginning of the second storage device 106 if there was no provision for the unexposed locations 210, 212 that are at least equal in size to the maximum data transfer size stored in the maximum data transfer size data structure 122.

From step C, control proceeds to step D 308 in which the storage management application 114 atomically updates the metadata 118 to indicate that the current data that spans the storage device boundary is on the first storage device 104, and then the lock 120 on the metadata 118 is released in step E 310 by the storage management application 114. Once the metadata 118 is atomically updated at step D 308, the unexposed locations 210 of the first storage device 104 on which the entirety of the new write data is written become newly exposed locations of the first storage device 104 and the new write data written to the first storage device 104 becomes the current data. The logical addresses corresponding to the newly exposed locations of the first storage device 104 may be accessed by applications 114, 116, 124, 126 that execute on the hosts 108, 110 or the controller 102. The previously exposed locations of the second storage device 106 are converted to unexposed locations 212.

Therefore, FIG. 3 illustrates certain embodiments in which after locking the metadata 118 the storage management application 114 writes to unexposed locations 210 of the first storage device 104 the entirety of the write data of a single write request that spans both the first storage device 104 and the second storage device 106. Since the entirety of the write data cannot exceed the maximum transfer size that is supported, the entirety of the write data may be written in the unexposed locations 210 which is at least of the size of the maximum transfer size indicated by the maximum data transfer size data structure 122.

Figure 4:
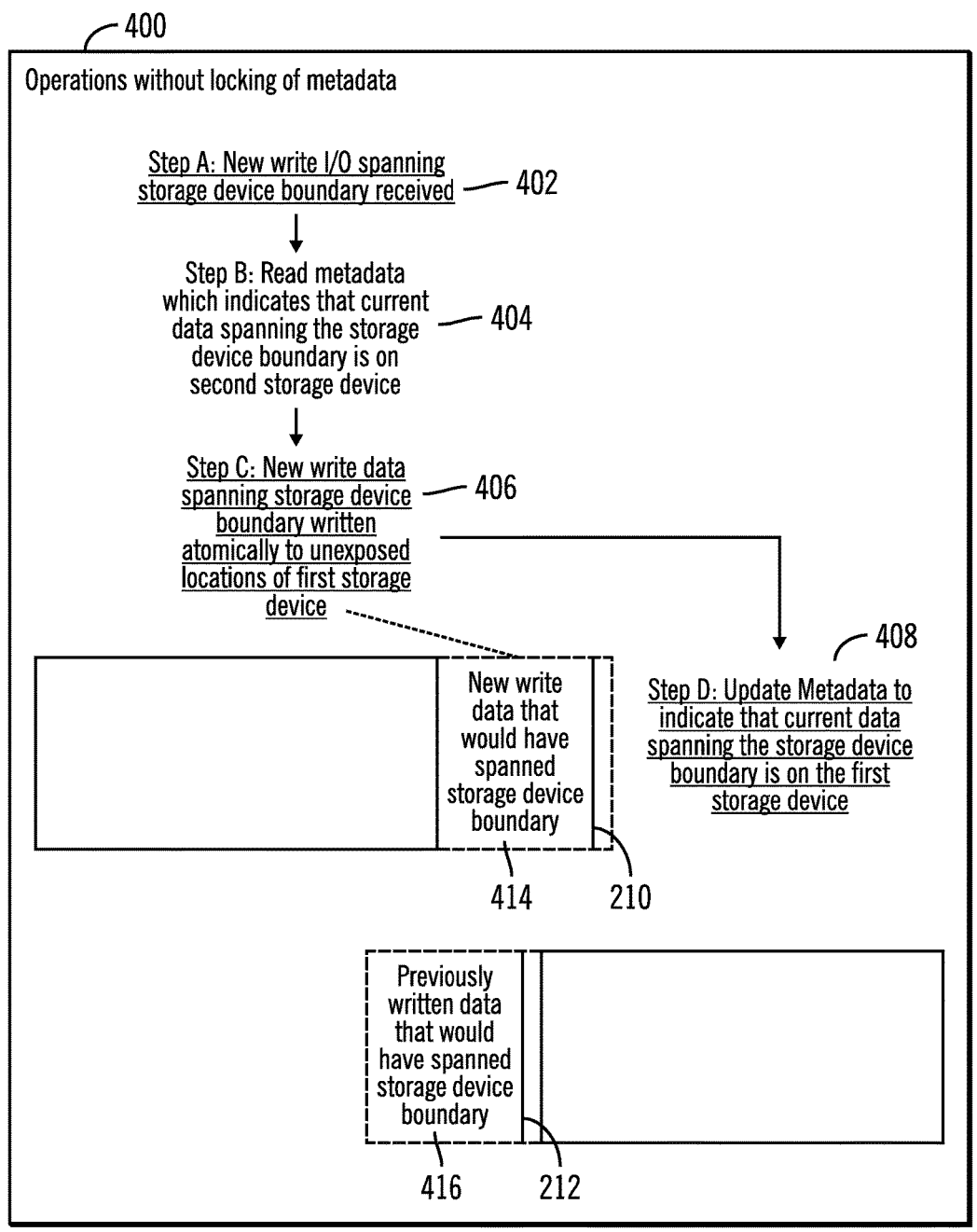
FIG. 4 illustrates a block diagram that shows operations for returning coherent data without locking of metadata, in accordance with certain embodiments.

FIG. 4 illustrates a block diagram 400 that shows operations for returning coherent data without locking of metadata, in accordance with certain embodiments.

In step A 402 the storage management application 114 receives a new write I/O that spans storage device boundaries. Control proceeds to step B 404 in which the storage management application 114 reads the metadata 118 that indicates that the most recent version of data 416 that is already written to the storage locations of the new write I/O is in the second storage device 106 in the storage locations 212 which were previously unexposed but are currently exposed. Control proceeds to step C 406 in which the storage management application 114 atomically writes the entirety of the new write data that spans the storage device boundary to the unexposed locations 210 of the first storage device 104.

At the conclusion of step C 406 the unexposed locations 210 on the first storage device 104 have the new write data 414 whereas the locations 212 of the second storage device 106 have the previously written data 416 to the same logical storage addresses.

From step C, control proceeds to block D 408 in which the storage management application 114 atomically updates the metadata 118 to indicate that the current data that spans the storage device boundary is on the first storage device 104. Once the metadata 118 is atomically updated at step D 408, the unexposed locations of the first storage device 104 on which the entirety of the new write data is written become newly exposed locations of the first storage device 104 and the new write data written to the first storage device 104 becomes the current data. The exposed locations 212 on the second storage device 106 are converted to unexposed locations.

Therefore, FIG. 4 illustrates certain embodiments in which without locking the metadata 118 the storage management application 114 writes to unexposed locations 210 of the first storage device 104 the entirety of the write data of a single write request than spans both the first storage device 104 and the second storage device 106. Since the entirety of the write data cannot exceed the maximum transfer size that is supported, the entirety of the write data may be written in the unexposed locations 210 which is at least of the size of the maximum transfer size.

Figure 5:
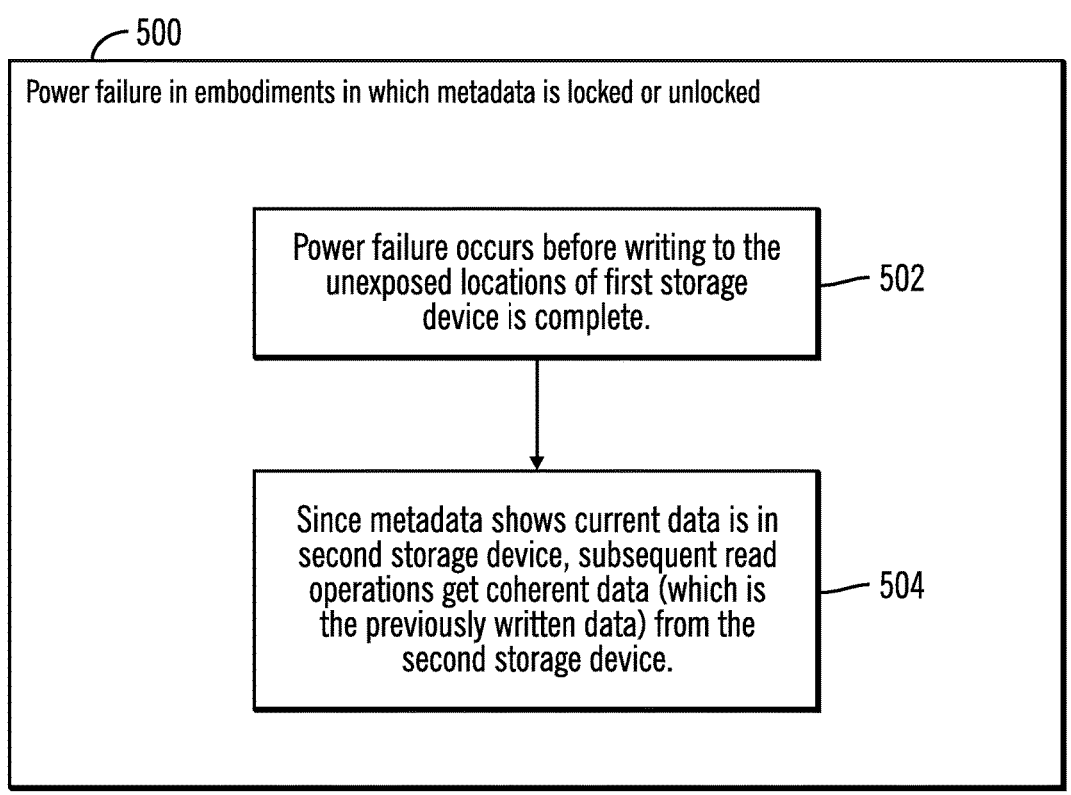
FIG. 5 illustrates returning coherent data in the event of a power failure or other types of failure, in accordance with certain embodiments.

FIG. 5 illustrates a block diagram 500 that shows operations for returning coherent data in the event of a power failure or other types of failure, in accordance with certain embodiments. At block 502 it is shown that a power failure (so some other type of failure) occurs before the atomic writing to the unexposed locations 210 of the first storage device 104 is complete. Since the metadata 118 in such embodiments shows that the current data is in the second storage device 106, subsequent read requests for the same logical addresses as the write request may secure coherent data (which is the previously written data 316, 416) from the second storage device 106. Therefore, in the event of a failure (e.g., a power failure, error in tracks, etc.) of the first storage device 104 while writing new data, the previously written data may be returned from the exposed locations (i.e., previously unexposed locations 212) of the second storage device 106, in response to a read request. It should be noted that when the writing of data is completed atomically and the metadata 118 is updated, then previously unexposed locations of the first storage device are converted to newly exposed locations of the first storage device, and the exposed locations of the second storage device 106 are converted into unexposed locations of the second storage device 106.

Figure 6:
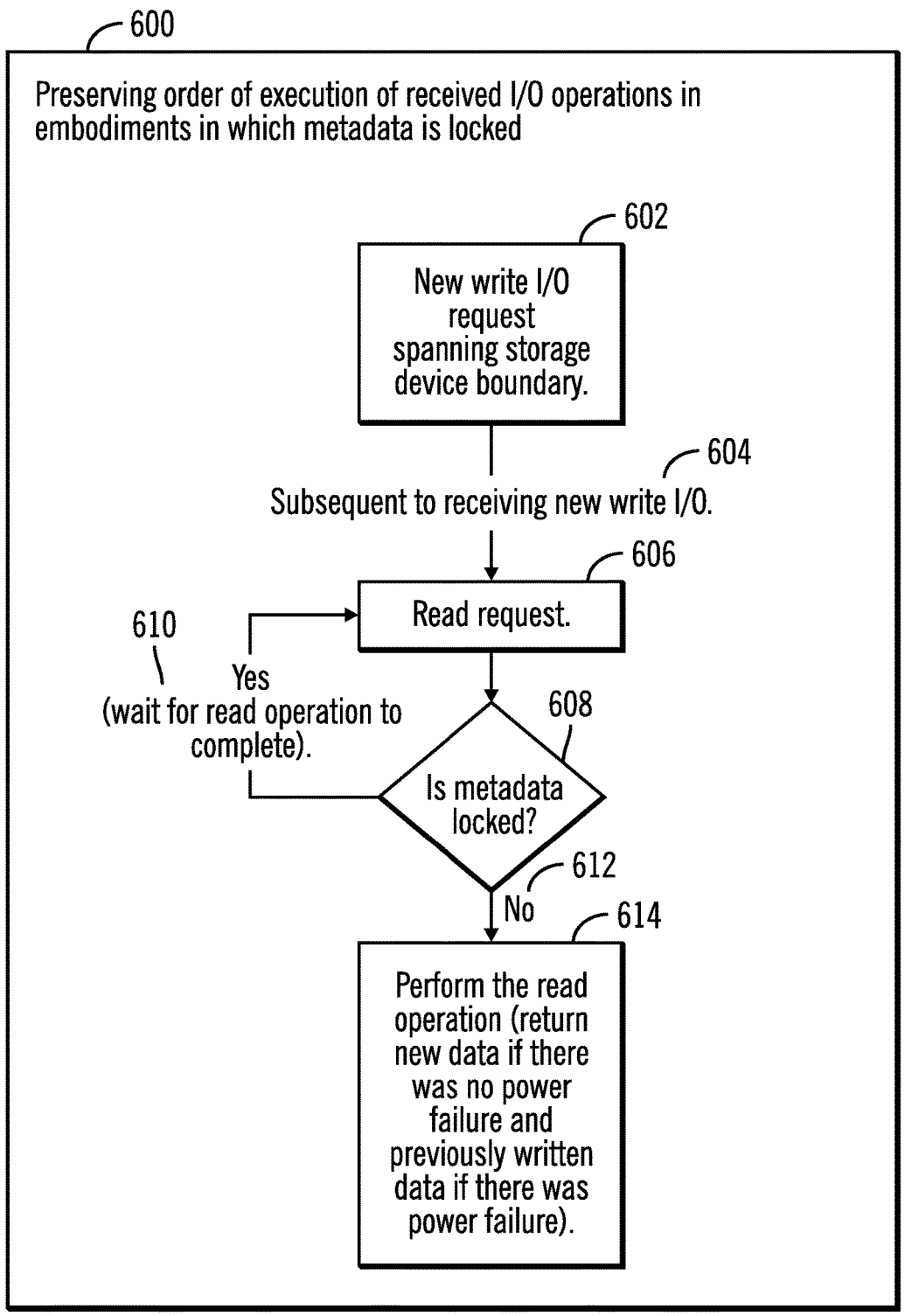
FIG. 6 illustrates a flowchart that shows the preservation of the order of execution of I/O operations when metadata is locked, in accordance with certain embodiments.

FIG. 6 illustrates a flowchart 600 that shows the preservation of the order of execution of I/O operations when locking of the metadata 118 is performed, in accordance with certain embodiments. The operations shown in FIG. 6 may be performed by the storage management application 114 that executes in the controller 102.

Control starts at block 602 in which a new write I/O request that spans a storage device boundary received. Subsequent to receiving the new write I/O request (shown via reference numeral 604), a read request that attempts to read the same logical addresses corresponding to the write I/O request is received (shown via reference numeral 606). Prior to performing the reading of the data from the logical addresses designated by the read request, the storage management application 114 determines (at block 608) whether the metadata 118 is locked. If so, then the write I/O operation (in block 602) has exclusive access to the metadata 118 and the reading of the data from the logical addresses designated by the read request has to wait (reference numeral 610) and control returns to block 606.

It at block 608 it is determined that the metadata 118 is not locked (For example, it may be determined that the metadata 118 is not locked if the lock on the metadata 118 had been released earlier by the storage management application 114 as shown in block 310 of FIG. 3), then control proceeds ("No" branch 612) to block 614, where the storage management application 114 performs the read operation. New data from the first storage device 104 is returned if there was no power failure in the first storage device 104, and previously written data from the second storage device 106 is returned if there was a power failure in the first storage device 104.

Therefore, in FIG. 6 when locking of the metadata 118 is performed, the order of execution of I/O operations is maintained. The read operation that is received after the write operation cannot be completed until the write operation has completed or a power failure has occurred while performing the write operation.

Figure 7:
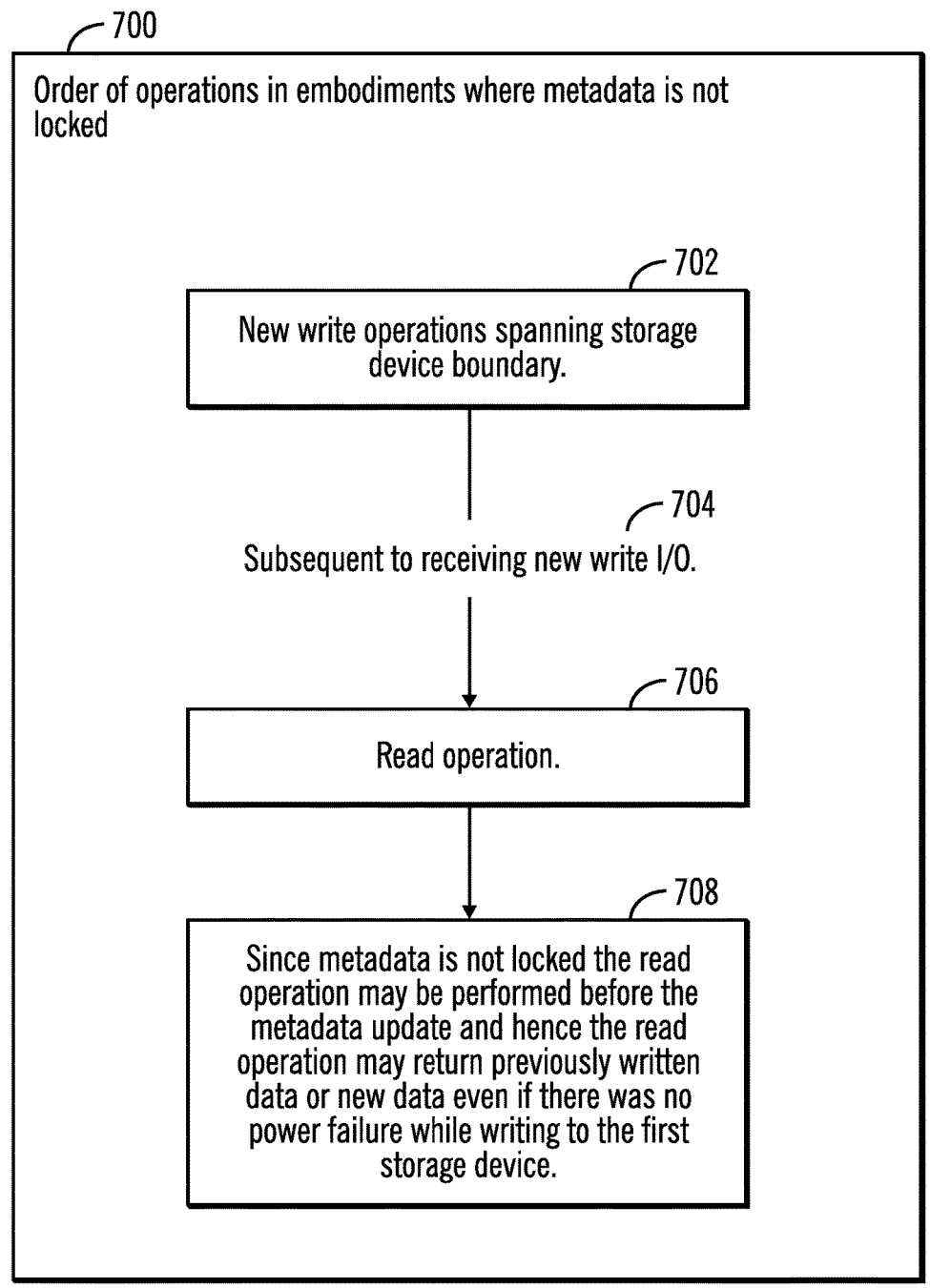
FIG. 7 illustrates a flowchart that shows that the order of execution of I/O operations may not be preserved when metadata is not locked, in accordance with certain embodiments.

FIG. 7 illustrates a flowchart 700 that shows that the order of execution of I/O operations may not be preserved when metadata is not locked, in accordance with certain embodiments. The operations shown in FIG. 7 may be performed by the storage management application 114 that executes in the controller 102.

Control starts at block 702 in which a new write I/O operation spanning storage device boundary is received. Subsequent to receiving the new write I/O operation (shown via reference numeral 704) a read operation that attempts to read the same logical addresses corresponding to the write I/O operation is received (shown via reference numeral 706).

In the embodiments shown in FIG. 7 there is no locking of the metadata 118. Since the metadata 118 is not locked, the read operation may be performed before the metadata update (step D 408 in FIG. 4) that indicates that atomic writing of the write data to the first storage device 104 is complete and the current data is in the first storage device 104. Therefore, the read operation may return previously written data or new data even if there was no power failure while writing to the first storage device 104 (at block 708). Previously written data may be returned if the metadata update is not over, whereas new data may be returned if the metadata update is over.

Therefore, in FIG. 7 when locking of the metadata 118 is performed, the order of execution of I/O operations is not maintained. The read operation that is received after the write operation may be completed before the write operation has completed, even though the write operation was received before the read operation.

Figure 8:
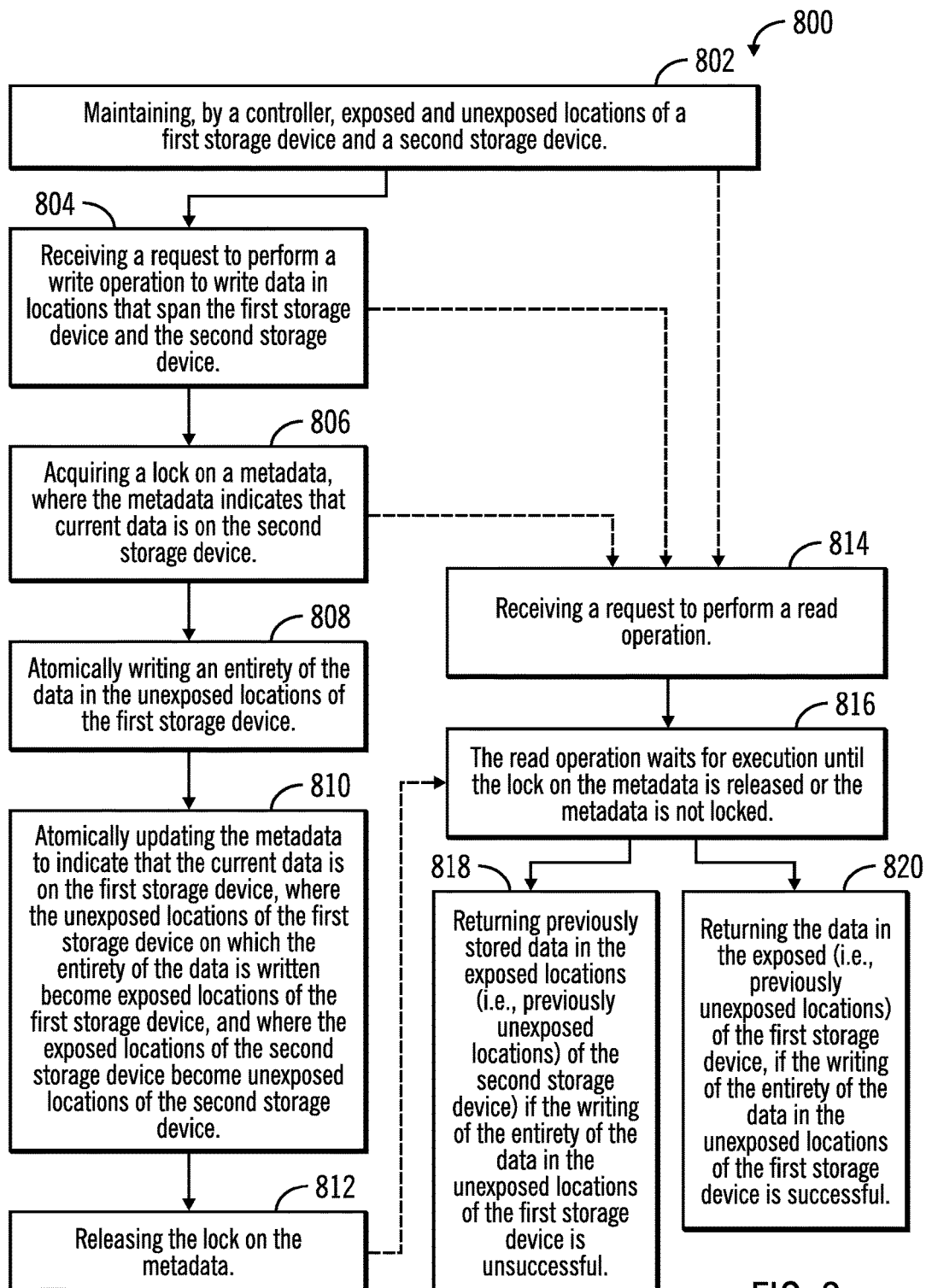
FIG. 8 illustrates a flowchart for returning coherent data when a locking of metadata is performed, in accordance with certain embodiments.

FIG. 8 illustrates a flowchart 800 for returning coherent data when a locking of metadata is performed, in accordance with certain embodiments. The operations shown in FIG. 8 may be performed by the storage management application 114 that executes in the controller 102.

Control starts at block 802 in which a controller 102 maintains exposed 206, 208 and unexposed locations 210, 212 of a first storage device 104 and a second storage device 106. A request is received (at block 804) to perform a write operation to write data in locations that span the first storage device 104 and the second storage device 106.

Control proceeds to block 806 in which the storage management application 114 acquires a lock on the metadata 118, wherein the metadata 118 at this point in time indicates that the current data corresponding to logical addresses of the write operation is in the second storage device 806. The storage management application 114 atomically writes (at block 808) the entirety of the write data in the exposed locations 210 of the first storage device 104, and then atomically updates (at block 810) the metadata 118 to indicate that the current data is in the first storage device 104, where the unexposed locations of the first storage device 104 on which the entirety of the data is written become exposed locations of the first storage device 104, and the exposed locations of the second storage device 106 become unexposed locations of the second storage device 106. Then, the lock 120 on the metadata 118 is released (at block 812) by the storage management application 114.

From block 802, 804, 806 control may also proceed to block 814 in which a request is received to perform a read operation on logical addresses that are the same logical addresses as that of the write operations. The read operation waits (at block 816) for execution until the lock 120 on the metadata 118 is released or the metadata 118 is not locked. From block 816 control may proceed to block 818 or block 820. At block 818, the storage management application 114 returns previously stored data in the exposed locations (i.e., previously unexposed locations 212) of the second storage device 106, if the writing of the entirety of the data in the unexposed locations 210 of the first storage device 104 is unsuccessful. At block 820, the storage management application 114 returns the data in the exposed locations (i.e., previously unexposed locations 210) of the first storage device 104, if the writing of the entirety of the data in the unexposed locations 210 of the first storage device 104 is successful. The successful writing of the entirety of the data in the unexposed locations 210 of the first storage device 104 converts the unexposed locations 210 of the first storage device 104 into the exposed locations of the first storage device 104.

Therefore, FIG. 8 illustrates certain embodiments in which if the metadata 118 is locked prior to writing the write data on unexposed locations 210 of the first storage device 104, then read operations return coherent data. If the read request is received after the write request, the read operations are performed after executing the write operations.

Figure 9:
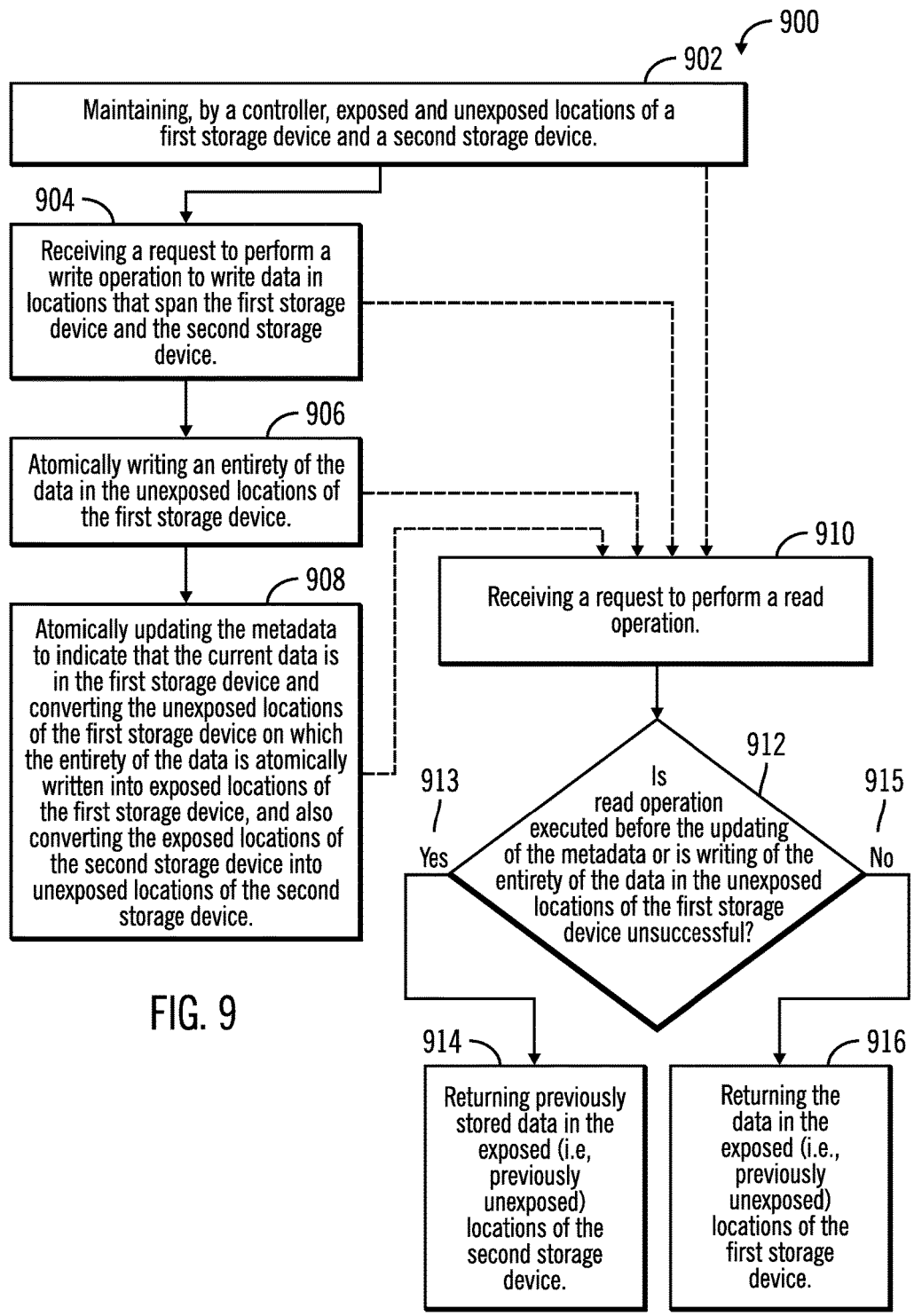
FIG. 9 illustrates a flowchart for returning coherent data when no locking of metadata is performed, in accordance with certain embodiments.

FIG. 9 illustrates a flowchart 900 for returning coherent data when no locking of the metadata 118 is performed, in accordance with certain embodiments. The operations shown in FIG. 9 may be performed by the storage management application 114 that executes in the controller 102.

Control starts at block 902 in which a controller 102 maintains exposed 206, 208 and unexposed locations 210, 212 of a first storage device 104 and a second storage device 106. A request is received (at block 904) to perform a write operation to write data in logical addresses that are mapped to locations that span the first storage device 104 and the second storage device 106.

The storage management application 114 atomically writes (at block 906) the entirety of the write data in the unexposed locations 210 of the first storage device 104, and then atomically updates (at block 908) the metadata 118 to indicate that the current data is on the first storage device 104. On atomic update of the metadata 118 the unexposed locations of the first storage device 104 on which the entirety of the data is atomically written is converted into exposed locations of the first storage device, and the exposed locations of the second storage device 106 are converted into unexposed locations of the second storage device 106.

From block 902, 904, 906, 908 control may also proceed to block 910 in which a request is received to perform a read operation from logical addresses that are the same logical addresses as that of the write operation. From block 910 control proceeds to block 912 in which a determination is made as to whether the read operation is executed before the updating of the metadata 118 or is writing of the entirety of the data in the unexposed locations 210 of the first storage device 104 is unsuccessful. If so ("Yes" branch 913 from block 912), control proceeds to block 914 in which previously stored data in the exposed (previously unexposed locations 212) of the second storage device 106 are returned. If not ("No" branch 915 from block 912), then the data in the exposed (i.e., previously unexposed locations 210) of the first storage device 104 is returned.

Therefore, FIG. 9 illustrates certain embodiments in which when the metadata 118 is not locked prior to writing the write data on unexposed locations 210 of the first storage device 104, then read operations return coherent data. Even if the read request is received after the write request, the read operations may be performed before or after completion of the execution of the write operations. The avoidance of the locking of the metadata 118 speeds up the process of performing I/O at the cost of allowing for out of order I/O operations. However, coherency of returned data is preserved.

Therefore, FIGS. 1-9 illustrate certain embodiments to return coherent data in response to a failure of a first storage device while writing data that spans across two storage devices. Embodiments that avoid locking of the metadata 118 speeds up I/O operations and maintains coherency of data but allow out of order I/O operations to be performed.

In certain embodiments, striping is a process of dividing a body of data into blocks and spreading the data blocks into multiple storage devices, such as HDDs or SSDs. A stripe may be comprised of the data divided across the set of HDDs or SSDs, and a striped unit that is referred to as a strip refers to the data slice on an individual drive. In such embodiments, each strip on a member HDD or SSD (or an end and a beginning of a HDD or SDD in a concatenation) has a moveable virtual boundary that describes the edge of the strip. A controller for the HDDs or SSDs may save the location of the boundary in metadata and over-allocate the strip size on each HDD/SSD, but only expose the standard strip size. The same amount over-allocated at the end of one strip is over-allocated at the front of the next strip on the next HDD/SSD. For example, the strip size exposed may be 64 KB, but the controller may have allocated 128 KB for each strip. The controller maintains the virtual location of where the strip starts and ends within the metadata. By controlling the virtual strip start and end, the controller may ensure that writes spanning storage device boundaries are written to only one storage device, instead of having to split the writes into two I/O operations. In such embodiments, there may not be any corruption if the controller uses the embodiments described in FIGS. 1-9.

The embodiments described in FIGS. 1-9 may provide protection against corruption in NVDRAM or byte addressable three dimensional cross point memory that are used as memory. In certain embodiments where memory banks of byte addressable three dimensional cross point memory/NVDRAM are striped in any way, there may be a gap for memory writes that may span between the strip/bank of memory. In certain embodiments, the byte addressable three dimensional cross point memory/NVDRAM may be protected from the exposure of corruption during data loss on memory writes that span between the strip/bank of memory by using the embodiments described in FIGS. 1-9.

The described operations may be implemented as a method, apparatus or computer program product using standard programming and/or engineering techniques to produce software, firmware, hardware, or any combination thereof. The described operations may be implemented as code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard drive drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of the flowchart and block diagrams may be implemented by computer program instructions.

Figure 10:
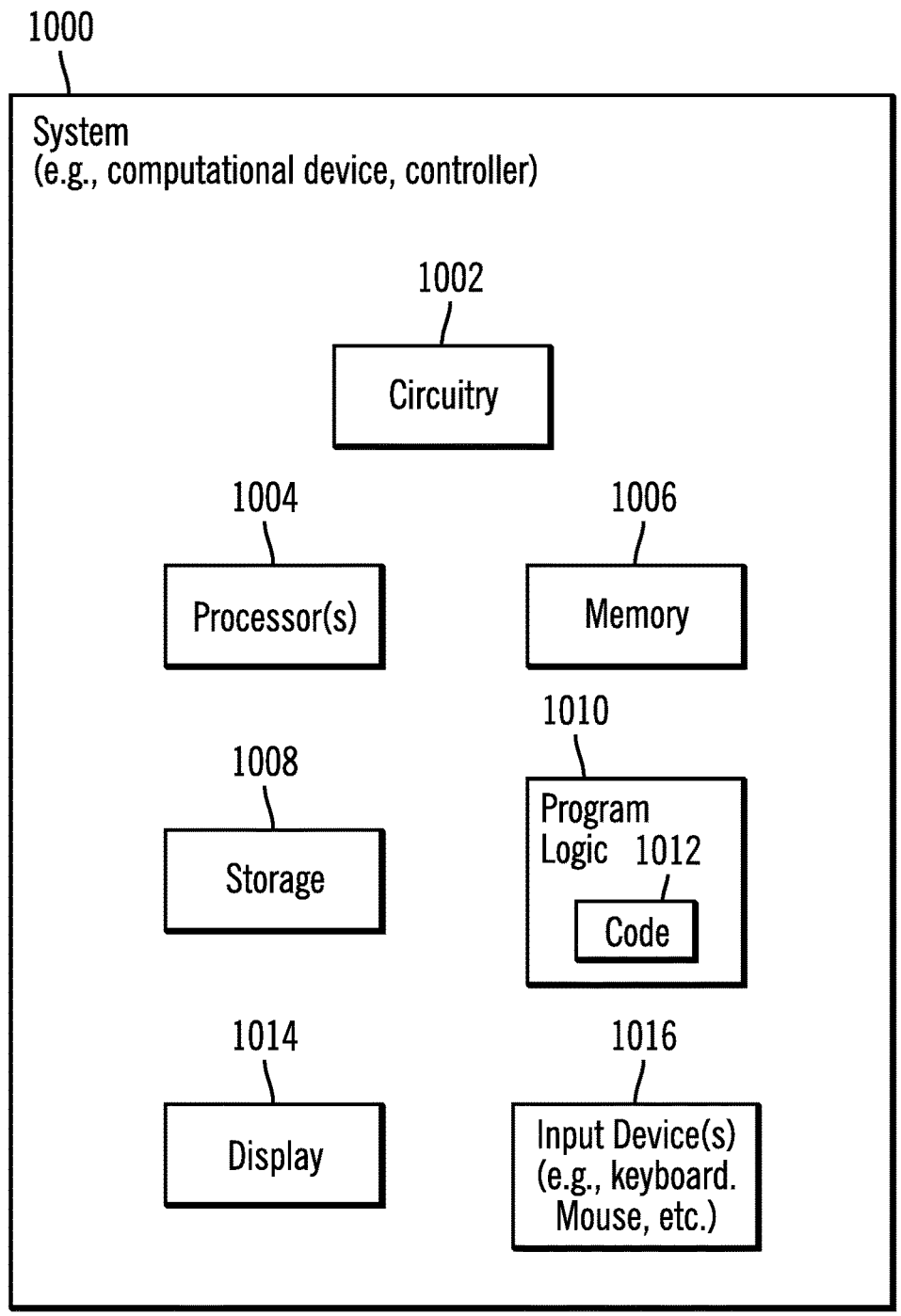
FIG. 10 illustrates a block diagram of a system including a computational device or a controller, in accordance with certain embodiments.

FIG. 10 illustrates a block diagram of a system 1000 that may include both the hosts 108, 110 and/or the controller 102. For example, in certain embodiments the system 1000 may be a computer (e.g., a laptop computer, a desktop computer, a tablet, a cell phone or any other suitable computational device) that has the host 108 and the controller 102 both included in the system 1000. In certain embodiments the system 1000 may be a server computer or a controller that includes or is coupled to the storage devices 104, 106. The system 1000 may include a circuitry 1002 that may in certain embodiments include at least a processor 1004. The system 1000 may also include a memory 1006 (e.g., a volatile memory device), and storage 1008. The storage 1008 may include a solid state drive, a disk drive, or other drives or devices including a non-volatile memory device (e.g., EEPROM, ROM, PROM, flash, firmware, programmable logic, etc.). The storage 1008 may also include a magnetic disk drive, an optical disk drive, a tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008.

In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002. The system 1000 may also include a display 1014 (e.g., an liquid crystal display (LCD), a light emitting diode (LED) display, a cathode ray tube (CRT) display, a touchscreen display, or any other suitable display). The system 1000 may also include one or more input devices 1016, such as, a keyboard, a mouse, a joystick, a trackpad, or any other suitable input devices). Other components or devices beyond those shown in FIG. 10 may also be found in the system 1000.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

EXAMPLES

Example 1 is a method in which a controller maintains exposed and unexposed locations of a first storage device and a second storage device. In response to receiving a request a perform a write operation to write data in locations that span the first storage device and the second storage device, the controller atomically writes an entirety of the data in the unexposed locations of the first storage device.

In example 2, the subject matter of example 1 may include that in response to receiving a request to perform a read operation, the controller returns stored data in the exposed locations of the second storage device if the writing of the entirety of the data in the unexposed locations of the first storage device is unsuccessful.

In example 3, the subject matter of example 2 may include that the unexposed locations are at least equal in size to a maximum data transfer size supported by the controller, wherein the exposed locations of the second storage device were previously unexposed locations of the second storage device. The unexposed locations are allocated towards an end of locations on the first storage device, and towards a beginning of locations on the second storage device, wherein the unexposed locations are not exposed to other entities besides the controller.

In example 4, the subject matter of example 2 may include that in response to receiving the request to perform the write operation, and prior to atomically writing the entirety of the data, acquiring a lock on a metadata, wherein the metadata indicates that current data is on the exposed locations of the second storage device; subsequent to atomically writing the entirety of the data, atomically updating the metadata to indicate that the current data is on the first storage device, and wherein in response to atomically updating the metadata, the unexposed locations of the first storage device become the exposed locations of the first storage device, and the exposed locations of the second storage device become the unexposed locations of the second storage device; and releasing the lock on the metadata, subsequent to the updating of the metadata.

In example 5, the subject matter of example 4 may include that the read operation waits for execution until the lock on the metadata is released.

In example 6, the subject matter of example 5 may include that in response to successfully writing the entirety of the data on the unexposed locations of the first storage device to make the unexposed locations of the first storage device into the exposed locations of the first storage device, returning data from the exposed locations of the first storage device in response to the request to perform the read operation.

In example 7, the subject matter of example 2 may include that subsequent to atomically writing the data to the unexposed locations of the first storage device, atomically updating metadata to indicate that current data is on the first storage device, converting the unexposed locations of the first storage device into the exposed locations of the first storage device, and converting the exposed locations of the second storage device into the unexposed locations of the second storage device.

In example 8, the subject matter of claim 7 may include that the read operation is executed either before or subsequent to the updating of the metadata, wherein: if the read operation is executed before the updating of the metadata, then the stored data in the exposed locations of the second storage device is returned; and if the read operation is executed subsequent to the updating of the metadata, the data atomically written to the unexposed locations of the first storage device that are converted to the exposed locations of the first storage device is returned.

Example 9 is a system comprised of a memory and a processor coupled to the memory, where the processor is operable to maintain exposed and unexposed locations of a first storage device and a second storage device. In response to receiving a request a perform a write operation to write data in locations that span the first storage device and the second storage device, the processor is operable to atomically write an entirety of the data in the unexposed locations of the first storage device.

In example 10, the subject matter of example 9 may include that in response to receiving a request to perform a read operation, the processor is operable to return stored data in the exposed locations of the second storage device if the writing of the entirety of the data in the unexposed locations of the first storage device is unsuccessful.

In example 11, the subject matter of example 10 may include that the unexposed locations are at least equal in size to a maximum data transfer size supported by the controller, wherein the exposed locations of the second storage device were previously unexposed locations of the second storage device. The unexposed locations are allocated towards an end of locations on the first storage device, and towards a beginning of locations on the second storage device, wherein the unexposed locations are not exposed to other entities besides the controller.

In example 12, the subject matter of example 10 may include that in response to receiving the request to perform the write operation, and prior to atomically writing the entirety of the data, the processor is operable to acquire a lock on a metadata, wherein the metadata indicates that current data is on the exposed locations of the second storage device; subsequent to atomically writing the entirety of the data, the processor is operable to atomically update the metadata to indicate that the current data is on the first storage device, and wherein in response to atomically updating the metadata, the unexposed locations of the first storage device become the exposed locations of the first storage device, and the exposed locations of the second storage device become the unexposed locations of the second storage device; and the processor is operable to release the lock on the metadata, subsequent to the updating of the metadata.

In example 13, the subject matter of example 12 may include that the read operation waits for execution until the lock on the metadata is released.

In example 14, the subject matter of example 13 may include that in response to successfully writing the entirety of the data on the unexposed locations of the first storage device to make the unexposed locations of the first storage device into the exposed locations of the first storage device, the processor is operable to return data from the exposed locations of the first storage device in response to the request to perform the read operation.

In example 15, the subject matter of example 10 may include that subsequent to atomically writing the data to the unexposed locations of the first storage device, the processor is operable to atomically update metadata to indicate that current data is on the first storage device, convert the unexposed locations of the first storage device into the exposed locations of the first storage device, and convert the exposed locations of the second storage device into the unexposed locations of the second storage device.

In example 16, the subject matter of claim 15 may include that the read operation is executed either before or subsequent to the updating of the metadata, and wherein: if the read operation is executed before the updating of the metadata, then the stored data in the exposed locations of the second storage device is returned; and if the read operation is executed subsequent to the updating of the metadata, the data atomically written to the unexposed locations of the first storage device that are converted to the exposed locations of the first storage device is returned.

Example 17 is apparatus comprised of a plurality of non-volatile storage devices and a controller coupled to the plurality of non-volatile storage devices, wherein the controller is operable to perform operations, the operations comprising: maintaining exposed and unexposed locations of a first storage device and a second storage device of the plurality of non-volatile storage devices; in response to receiving a request a perform a write operation to write data in locations that span the first storage device and the second storage device, atomically writing an entirety of the data in the unexposed locations of the first storage device.

In example 18, the subject matter of example 17 may include that in response to receiving a request to perform a read operation, returning stored data in the exposed locations of the second storage device if the writing of the entirety of the data in the unexposed locations of the first storage device is unsuccessful.

In example 19, the subject matter of example 18 may include that the unexposed locations are at least equal in size to a maximum data transfer size supported by the controller, wherein the exposed locations of the second storage device were previously unexposed locations of the second storage device. The unexposed locations are allocated towards an end of locations on the first storage device, and towards a beginning of locations on the second storage device, wherein the unexposed locations are not exposed to other entities besides the controller.

In example 20, the subject matter of example 18 may include that the operations further comprise: in response to receiving the request to perform the write operation, and prior to atomically writing the entirety of the data, acquiring a lock on a metadata, wherein the metadata indicates that current data is on the exposed locations of the second storage device; subsequent to atomically writing the entirety of the data, atomically updating the metadata to indicate that the current data is on the first storage device, and wherein in response to atomically updating the metadata, the unexposed locations of the first storage device become the exposed locations of the first storage device, and the exposed locations of the second storage device become the unexposed locations of the second storage device; and releasing the lock on the metadata, subsequent to the updating of the metadata.

In example 21, the subject matter of example 20 may include that the read operation waits for execution until the lock on the metadata is released.

In example 22, the subject matter of example 21 may include that in response to successfully writing the entirety of the data on the unexposed locations of the first storage device to make the unexposed locations of the first storage device into the exposed locations of the first storage device, returning data from the exposed locations of the first storage device in response to the request to perform the read operation.

In example 23, the subject matter of example 18 may include that that operations further comprise: subsequent to atomically writing the data to the unexposed locations of the first storage device, atomically updating metadata to indicate that current data is on the first storage device, converting the unexposed locations of the first storage device into the exposed locations of the first storage device, and converting the exposed locations of the second storage device into the unexposed locations of the second storage device; if the read operation is executed before the updating of the metadata, then the stored data in the exposed locations of the second storage device is returned; and if the read operation is executed subsequent to the updating of the metadata, the data atomically written to the unexposed locations of the first storage device that are converted to the exposed locations of the first storage device is returned.

Example 24 is a system comprised of a plurality of non-volatile storage devices comprising a first storage device and a second storage device; a display; and a processor coupled to the plurality of non-volatile storage devices and the display, wherein the non-volatile storage devices are operable to: maintain exposed and unexposed locations of the first storage device and a second storage device; in response to receiving a request a perform a write operation to write data in locations that span the first storage device and the second storage device, atomically write an entirety of the data in the unexposed locations of the first storage device.

In example 25, the subject matter of example 24 may include that in response to receiving a request to perform a read operation, returning stored data in the exposed locations of the second storage device if the writing of the entirety of the data in the unexposed locations of the first storage device is unsuccessful.

What is claimed is:

1. A method, comprising:
   maintaining, by a controller, exposed and unexposed locations of a first storage device and a second storage device;
   in response to receiving a request to perform a write operation to write data in locations that span the first storage device and the second storage device, atomically writing an entirety of the data in the unexposed locations of the first storage device; and
   in response to receiving a request to perform a read operation, returning stored data in the exposed locations of the second storage device if the writing of the entirety of the data in the unexposed locations of the first storage device is unsuccessful.

2. The method of claim 1, wherein the unexposed locations are at least equal in size to a maximum data transfer size supported by the controller, wherein the exposed locations of the second storage device were previously unexposed locations of the second storage device, wherein the unexposed locations are allocated towards an end of locations on the first storage device, and towards a beginning of locations on the second storage device, and wherein the unexposed locations are not exposed to other entities besides the controller.

3. The method of claim 1, the method further comprising:
   in response to receiving the request to perform the write operation, and prior to atomically writing the entirety of the data, acquiring a lock on a metadata, wherein the metadata indicates that current data is on the exposed locations of the second storage device;
   subsequent to atomically writing the entirety of the data, atomically updating the metadata to indicate that the current data is on the first storage device, wherein in response to atomically updating the metadata, the unexposed locations of the first storage device become the exposed locations of the first storage device, and the exposed locations of the second storage device become the unexposed locations of the second storage device; and
   releasing the lock on the metadata, subsequent to the updating of the metadata.

4. The method of claim 3, wherein the read operation waits for execution until the lock on the metadata is released.

5. The method of claim 4, the method further comprising:
   in response to successfully writing the entirety of the data on the unexposed locations of the first storage device to make the unexposed locations of the first storage device into the exposed locations of the first storage device, returning data from the exposed locations of the first storage device in response to the request to perform the read operation.

6. The method of claim 1, the method further comprising:
   subsequent to atomically writing the data to the unexposed locations of the first storage device, atomically updating metadata to indicate that current data is on the first storage device, converting the unexposed locations of the first storage device into the exposed locations of the first storage device, and converting the exposed locations of the second storage device into the unexposed locations of the second storage device.

7. The method of claim 6, wherein the read operation is executed either before or subsequent to the updating of the metadata, and wherein:
   if the read operation is executed before the updating of the metadata, then the stored data in the exposed locations of the second storage device is returned; and
   if the read operation is executed subsequent to the updating of the metadata, the data atomically written to the unexposed locations of the first storage device that are converted to the exposed locations of the first storage device is returned.

8. A system, comprising:
   a memory; and
   a processor coupled to the memory, wherein the processor is operable to:
   maintain exposed and unexposed locations of a first storage device and a second storage device;
   in response to receiving a request to perform a write operation to write data in locations that span the first storage device and the second storage device, atomically write an entirety of the data in the unexposed locations of the first storage device; and
   in response to receiving a request to perform a read operation, return stored data in the exposed locations of the second storage device if the writing of the entirety of the data in the unexposed locations of the first storage device is unsuccessful.

9. The system of claim 8, wherein the unexposed locations are at least equal in size to a maximum data transfer size, wherein the exposed locations of the second storage device were previously unexposed locations of the second storage device, wherein the unexposed locations are allocated towards an end of locations on the first storage device, and towards a beginning of locations on the second storage device, and wherein the unexposed locations are not exposed to other entities besides the system.

10. The system of claim 8, wherein the processor is further operable to:
in response to receiving the request to perform the write operation, and prior to atomically writing the entirety of the data, acquire a lock on a metadata, wherein the metadata indicates that current data is on the exposed locations of the second storage device;
subsequent to atomically writing the entirety of the data, atomically update the metadata to indicate that the current data is on the first storage device, wherein in response to atomically updating the metadata, the unexposed locations of the first storage device become the exposed locations of the first storage device, and the exposed locations of the second storage device become the unexposed locations of the second storage device; and
release the lock on the metadata, subsequent to the updating of the metadata.

11. The system of claim 10, wherein the read operation waits for execution until the lock on the metadata is released.

12. The system of claim 11, wherein the processor is further operable to:
in response to successfully writing the entirety of the data on the unexposed locations of the first storage device to make the unexposed locations of the first storage device into the exposed locations of the first storage device, return data from the exposed locations of the first storage device in response to the request to perform the read operation.

13. The system of claim 8, wherein the processor is further operable to:
subsequent to atomically writing the data to the unexposed locations of the first storage device, atomically update metadata to indicate that current data is on the first storage device, convert the unexposed locations of the first storage device into the exposed locations of the first storage device, and convert the exposed locations of the second storage device into the unexposed locations of the second storage device.

14. The system of claim 13, wherein the read operation is executed either before or subsequent to the updating of the metadata, and wherein:
if the read operation is executed before the updating of the metadata, then the stored data in the exposed locations of the second storage device is returned; and
if the read operation is executed subsequent to the updating of the metadata, the data atomically written to the unexposed locations of the first storage device that are converted to the exposed locations of the first storage device is returned.

15. An apparatus, comprising:
a plurality of non-volatile storage devices; and
a controller coupled to the plurality of non-volatile storage devices, wherein the controller is operable to:
maintain exposed and unexposed locations of a first storage device and a second storage device of the plurality of non-volatile storage devices;
in response to receiving a request to perform a write operation to write data in locations that span the first storage device and the second storage device, atomically write an entirety of the data in the unexposed locations of the first storage device; and
in response to receiving a request to perform a read operation, return stored data in the exposed locations of the second storage device if the writing of the entirety of the data in the unexposed locations of the first storage device is unsuccessful.

16. The apparatus of claim 15, wherein the unexposed locations are at least equal in size to a maximum data transfer size supported by the controller, wherein the exposed locations of the second storage device were previously unexposed locations of the second storage device, wherein the unexposed locations are allocated towards an end of locations on the first storage device, and towards a beginning of locations on the second storage device, and wherein the unexposed locations are not exposed to other entities besides the controller.

17. The apparatus of claim 15, the controller further operable to:
in response to receiving the request to perform the write operation, and prior to atomically writing the entirety of the data, acquiring a lock on a metadata, wherein the metadata indicates that current data is on the exposed locations of the second storage device;
subsequent to atomically writing the entirety of the data, atomically update the metadata to indicate that the current data is on the first storage device, wherein in response to atomically updating the metadata, the unexposed locations of the first storage device become the exposed locations of the first storage device, and the exposed locations of the second storage device become the unexposed locations of the second storage device; and
release the lock on the metadata, subsequent to the updating of the metadata.

18. The apparatus of claim 17, wherein the read operation waits for execution until the lock on the metadata is released.

19. The apparatus of claim 18, the controller further operable to:
in response to successfully writing the entirety of the data on the unexposed locations of the first storage device to make the unexposed locations of the first storage device into the exposed locations of the first storage device, return data from the exposed locations of the first storage device in response to the request to perform the read operation.

20. The apparatus of claim 15, the controller further operable to:
subsequent to atomically writing the data to the unexposed locations of the first storage device, atomically updating metadata to indicate that current data is on the first storage device, convert the unexposed locations of the first storage device into the exposed locations of the first storage device, and convert the exposed locations of the second storage device into the unexposed locations of the second storage device;
if the read operation is executed before the updating of the metadata, then the stored data in the exposed locations of the second storage device is returned; and
if the read operation is executed subsequent to the updating of the metadata, the data atomically written to the unexposed locations of the first storage device that are converted to the exposed locations of the first storage device is returned.

21. A system, comprising:
a plurality of non-volatile storage devices comprising a first storage device and a second storage device;

a display; and a processor coupled to the plurality of non-volatile storage devices and the display, wherein the non-volatile storage devices are operable to:

maintain exposed and unexposed locations of the first storage device and a second storage device;

in response to receiving a request to perform a write operation to write data in locations that span the first storage device and the second storage device, atomically write an entirety of the data in the unexposed locations of the first storage device; and in response to receiving a request to perform a read operation, return stored data in the exposed locations of the second storage device if the writing of the entirety of the data in the unexposed locations of the first storage device is unsuccessful.

* * * * *